(12) United States Patent
Yamamura

(10) Patent No.: US 9,939,812 B2
(45) Date of Patent: Apr. 10, 2018

(54) CONTROL APPARATUS FOR AUTONOMOUSLY NAVIGATING UTILITY VEHICLE

(71) Applicant: Honda Motor Co., Ltd., Tokyo (JP)

(72) Inventor: Makoto Yamamura, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 15/080,102

(22) Filed: Mar. 24, 2016

(65) Prior Publication Data

US 2016/0282867 A1 Sep. 29, 2016

(30) Foreign Application Priority Data

Mar. 27, 2015 (JP) .................................. 2015-067216

(51) Int. Cl.
| | | |
|---|---|---|
| G05D 1/00 | (2006.01) | |
| A01D 34/00 | (2006.01) | |
| G05D 1/02 | (2006.01) | |

(52) U.S. Cl.
CPC ......... *G05D 1/0088* (2013.01); *A01D 34/008* (2013.01); *G05D 1/0265* (2013.01); *G05D 1/0274* (2013.01); *G05D 1/0278* (2013.01); *G05D 2201/0208* (2013.01)

(58) Field of Classification Search
None
See application file for complete search history.

(56) References Cited

U.S. PATENT DOCUMENTS

| | | | | |
|---|---|---|---|---|
| 6,255,793 | B1 * | 7/2001 | Peless | A01D 34/008 180/168 |
| 8,744,626 | B2 * | 6/2014 | Johnson | A01D 34/008 700/250 |
| 9,072,219 | B2 * | 7/2015 | Da Rocha | A01D 34/008 |
| 9,516,806 | B2 * | 12/2016 | Yamauchi | G05D 1/0236 |
| 2008/0039974 | A1 * | 2/2008 | Sandin | G05D 1/028 700/258 |
| 2013/0006419 | A1 | 1/2013 | Bergström et al. | |
| 2015/0250097 | A1 | 9/2015 | Jägenstedt et al. | |
| 2016/0165795 | A1 * | 6/2016 | Balutis | G05D 1/0265 701/25 |

FOREIGN PATENT DOCUMENTS

| | | |
|---|---|---|
| JP | 2013164743 A | 8/2013 |
| WO | 2014058358 A1 | 4/2014 |

\* cited by examiner

*Primary Examiner* — Rodney A Butler
*Assistant Examiner* — Tamara L Weber
(74) *Attorney, Agent, or Firm* — Duft Bornsen & Fettig LLP

(57) ABSTRACT

An apparatus for controlling operation of an autonomously navigating utility vehicle equipped with a prime mover to travel about a working area delineated by a boundary line, there are provided with a map generating unit that that generates a working area map comprised of an array of a plurality of cells, a memory unit that counts and memorizes a number of times the vehicle passes over each of the cells based on the detected vehicle position; a target cell setting unit that selects one of the cells based on the memorized counted number and sets the selected one as a target cell; and a travel controlling unit that controls operation of the prime mover to make the vehicle travel about the working area until the vehicle has reached the boundary line, and make the vehicle turn toward the target cell and then travel straight forward when the vehicle has reached the boundary line.

10 Claims, 7 Drawing Sheets

CONTROL APPARATUS FOR AUTONOMOUSLY NAVIGATING UTILITY VEHICLE

CROSS-REFERENCE TO RELATED APPLICATION

This application is based upon and claims the benefit of priority from Japanese Patent Application No. 2015-067216 filed on Mar. 27, 2015, the contents of which are incorporated herein by reference.

BACKGROUND OF THE INVENTION

Field of the Invention

This invention relates to a control apparatus for an autonomously navigating utility vehicle that autonomously navigates and performs lawn mowing and/or other tasks in a working area.

Description of Related Art

Control apparatuses are known that control travel activity of an autonomously navigating utility vehicle of the type that performs a task while autonomously traveling in a working area delineated by a boundary wire, as taught by Japanese Laid-Open Patent Application No. 2013-164743, for example. The control apparatus of the reference controls the utility vehicle to carry out work in the working area by driving the utility vehicle forward and randomly changing direction of utility vehicle travel every time the utility vehicle reaches the boundary wire.

However, when the utility vehicle is turned in random directions as in the case of the control apparatus of the reference, disparity tends to arise between working area regions serviced at high and low frequency, making it hard to service the whole working area uniformly.

SUMMARY OF THE INVENTION

According to an aspect of the present invention, there is provided an apparatus for controlling an operation of an autonomously navigating utility vehicle equipped with a prime mover to travel about a working area delineated by a boundary line in order to perform work autonomously, comprising: an electronic control unit having a CPU and a memory, wherein the CPU is configured to function as a map generating unit that generates a working area map of the working area comprised of an array of a plurality of cells; a position detector that detects a first position of the autonomously navigating utility vehicle in the working area map and a second position of the autonomously navigating utility vehicle with respect to the boundary line of the working area; a memory unit that counts and memorizes a number of times the autonomously navigating utility vehicle passes over each of the cells in the memory based on the first position of the autonomously navigating utility vehicle detected by the position detector; a target cell setting unit that selects one of the cells based on the counted number memorized in the memory unit and sets the selected one as a target cell; and a travel controlling unit that determines whether the autonomously navigating utility vehicle has reached the boundary line based on the second position of the autonomously navigating utility vehicle detected by the position detector, and controls an operation of the prime mover to make the autonomously navigating utility vehicle travel about the working area until the autonomously navigating utility vehicle is determined to have reached the boundary line and make the autonomously navigating utility vehicle turn toward the target cell set by the target cell setting unit and then travel straight forward when the autonomously navigating utility vehicle is determined to have reached the boundary line, wherein the target cell setting unit calculates an average value of the counted number by dividing a sum of the counted numbers of the cells by a total number of the cells, selects the cells whose counted numbers memorized in the memory unit are smaller than the average value by a predetermined value or more, and sets one of the selected cells whose counted number memorized in the memory unit is smallest as the target.

BRIEF DESCRIPTION OF THE DRAWINGS

The objects, features, and advantages of the present invention will become clearer from the following description of embodiments in relation to the attached drawings, in which.

DETAILED DESCRIPTION OF THE INVENTION

Figure 1:
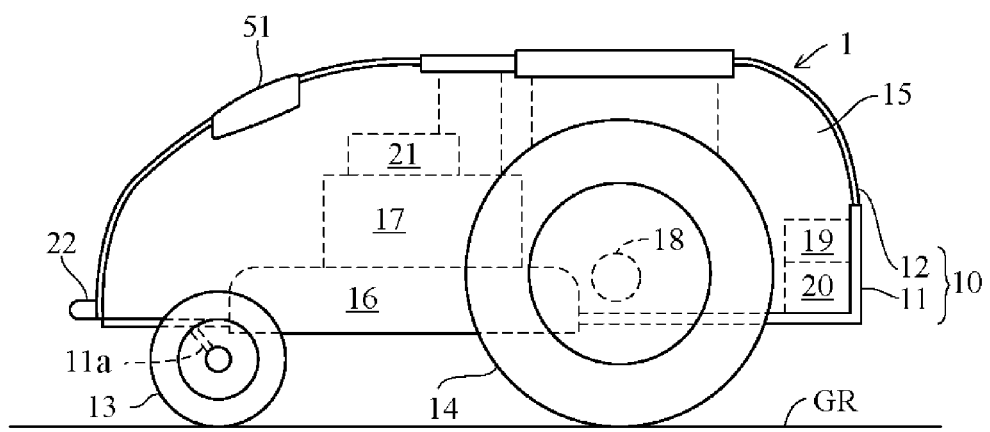
FIG. 1 is a side view schematically illustrating configuration of an autonomously navigating utility vehicle according to an embodiment of this invention.

An embodiment of the present invention is explained with reference to FIGS. 1 to 9 in the following. FIG. 1 is a side view schematically illustrating the configuration of an autonomously navigating utility vehicle according to an embodiment of the present invention, and FIG. 2 is plan view of the same.

The autonomously navigating utility vehicle of the present invention can be embodied in the form of various types of utility vehicle and particularly as a lawn mower for lawn or grass mowing work. In the following, the forward direction (longitudinal direction) of the utility vehicle in plan view and the vehicle width direction perpendicular to the forward direction are defined as the forward-rearward direction and the leftward-rightward direction, respectively, and the height direction of the utility vehicle is defined as the upward-downward direction. The configuration of the constituents is explained in line with these definitions.

Figure 2:
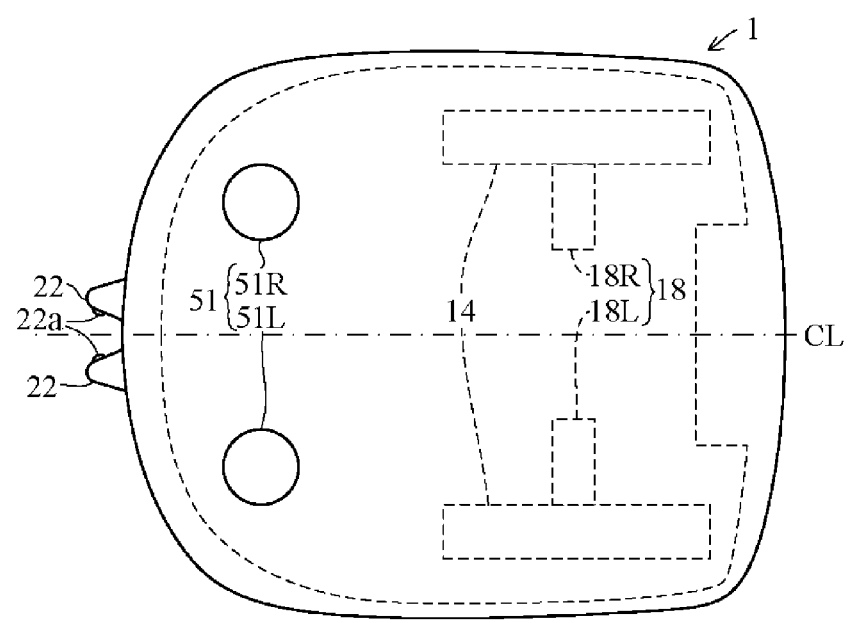
FIG. 2 is a plan view schematically illustrating the configuration of the utility vehicle according to the embodiment.

As shown in FIGS. 1 and 2, an autonomously navigating utility vehicle (hereinafter called simply "vehicle") 1 is equipped with a body 10 having a chassis 11 and a frame 12, along with a pair of left and right front wheels 13 and a pair of left and right rear wheels 14 that support the body 10 above a ground surface GR so as to be capable of travel.

The front wheels 13 are rotatably fastened through stays 11a to the front side of the chassis 11. The rear wheels 14, which are greater in diameter than the front wheels 13, are rotatably fastened directly to the rear end of the chassis 11. The weight and size of the vehicle 1 are such that it can be transported by an operator. As an example can be cited a vehicle 1 whose total length (forward-rearward direction length) is about 500 mm, total width about 300 mm, and height about 300 mm.

A work unit 16, a work motor 17 for driving the work unit 16, travel motors (prime mover) 18 for driving the rear wheels 14, a battery charging unit 19 and a battery 20 are deployed in an internal space 15 of the vehicle 1 enclosed by the chassis 11 and the frame 12.

The work unit 16 comprises a rotor and blades attached to the rotor and has a substantially disk-like shape as a whole. A rotating shaft is installed vertically at the center of the rotor and the work unit 16 is configured to enable adjustment of the height of the blades above the ground GR through a height regulating mechanism 21 by the operator. The height regulating mechanism 21 is equipped with, for example, a screw operable by the operator. The work motor 17 is constituted by an electric motor installed above the work unit 16, and an output shaft thereof is connected to the rotating shaft of the rotor to rotate the blades unitarily with the rotor.

The travel motors 18 comprise a pair of electric motors 18L and 18R installed on the right and left inner sides of the left and right rear wheels 14. Output shafts of the travel motors 18L and 18R are connected to rotating shafts of the left and right rear wheels 14, respectively, so as each to independently drive or rotate the left or right rear wheel 14. In other words, the vehicle 1 comprises the front wheels 13 as non-driven free wheels and the rear wheels 14 as driving wheels, and the travel motors 18L and 18R each independently rotates one of the rear wheels 14 normally (rotation to move forward) or reversely (rotation to move reverse). By establishing a difference between the rotating speeds of the left and right rear wheels 14, the vehicle 1 can be turned to an arbitrary direction.

For example, when the left and right rear wheels 14 are both rotated normally and the rotational speed of the right rear wheel 14 is greater than the rotational speed of the left rear wheel 14, the vehicle 1 turns left at a turning angle θ in accordance with the speed difference. Conversely, when the rotational speed of the left rear wheel 14 is greater than the rotational speed of the right rear wheel 14, the vehicle 1 turns right at a turning angle θ in accordance with the speed difference. When one of the left and right rear wheels 14 is rotated normally and the other reversely both at the same speed, the vehicle 1 turns on the spot.

The charging unit 19, which includes an AC-DC converter, is connected by wires to charging terminals 22 provided at the front end of the frame 12 and is also connected by wires to the battery 20. The charging terminals 22 have contacts 22a, and the battery 20 can be charged by connecting the charging terminals 22 through the contacts 22a to a charging station 3 (see FIG. 5). The battery 20 is connected through wires to the work motor 17 and the travel motors 18, and the work motor 17 and the travel motors 18 are driven by power supplied from the battery 20 through drivers.

Figure 3:
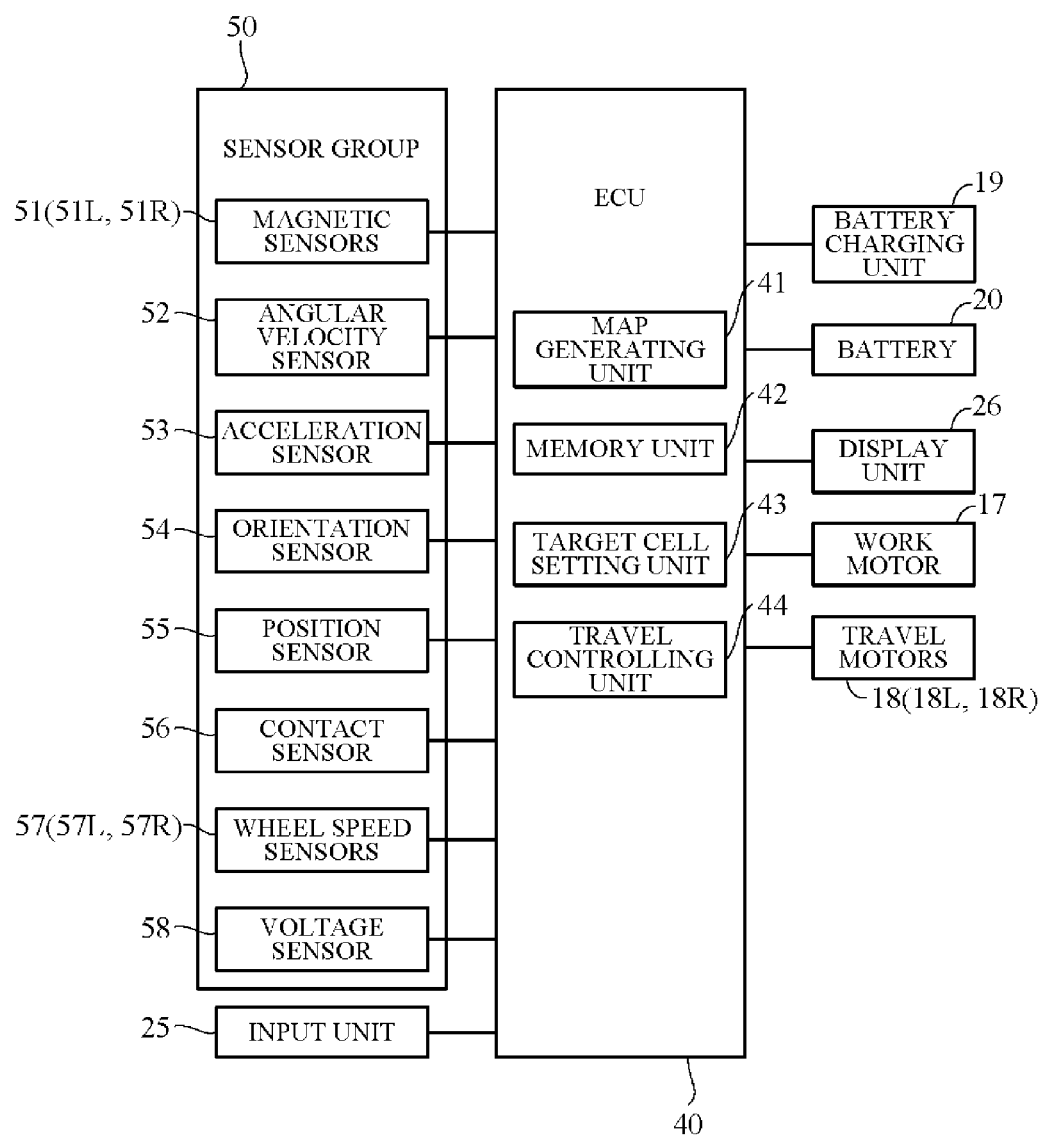
FIG. 3 is a block diagram showing the configuration of the control apparatus of the vehicle according to the present embodiment including an ECU.

FIG. 3 is a block diagram showing the configuration of the control apparatus of the vehicle 1 according to the present embodiment. As shown in FIG. 3, an Electronic Control Unit (ECU) 40 is mounted on the vehicle 1. The ECU 40 has a microcomputer of a configuration including an arithmetic processing unit (CPU) and memories ROM, RAM and other peripheral circuits.

The ECU 40 is connected with a group of sensors collectively designated by reference numeral 50 that detects various conditions of the vehicle 1, charging unit 19, battery 20, input unit 25, display unit 26, work motor 17 and travel motors 18 (18R, 18L). The group of sensors 50 includes a pair of magnetic sensors 51 (51R, 51L), an angular velocity sensor (turning angle sensor) 52, an acceleration sensor 53, an orientation sensor 54, a position sensor 55, a contact sensor 56, a pair of wheel speed sensors 57 (57R, 57L), and a voltage sensor 58.

The magnetic sensors 51, i.e., 51R and 51L are installed laterally spaced apart on the front side of the vehicle 1. More specifically, as shown in FIG. 2, the magnetic sensors 51R and 51L are installed laterally symmetrically with respect to a center line CL running in the straight forward direction along the widthwise center of the vehicle 1. The magnetic sensors 51 produces an output indicating magnitude of magnetic field (magnetic field strength (intensity) H).

The angular velocity sensor 52 produces an output indicating angular velocity (yaw rate) occurring around a height direction (z-axis) of the vehicle 1, from which a turning angle θ of the vehicle 1 around the z-axis can be calculated.

The acceleration sensor 53 produces an output indicating acceleration acting on the vehicle 1 in the directions of three orthogonal axes (x-axis, y-axis, and z-axis).

The orientation sensor 54 comprises a geomagnetic sensor of 2-axis or 3-axis structure that produces an output indicating geomagnetism, from which an orientation of the vehicle 1 relative to a reference orientation (e.g., north) can be detected.

The position sensor 55 is constituted as a GPS sensor and produces an output indicating the position (self-position) of the vehicle 1 in longitude and latitude by receiving radio waves transmitted from GPS satellites. The contact sensor 56 produces an output of ON signal when the frame 12 is detached from the chassis 11 owing to contact with an obstacle or the like. Each of the pair of wheel speed sensors 57R, 57L produces an output indicating wheel speed of one of the left and right rear wheels 14, from which a travel distance of the vehicle 1 can be calculated. The voltage sensor 58 produces an output indicating a residual voltage of the battery 20.

The input unit 25 has various switches provided to be manipulatable by the operator. The switches includes a main switch for inputting various commands, inter alia, start of vehicle 1 operation, an emergency stop switch for stopping the vehicle 1 in an emergency and devices such as numeric keypad, cursor key, switches, etc., also provided to be manipulatable by the operator.

The display unit 26 has a display that shows various information to be supplied to the operator, so that the operator can input commands through the devices of the input unit 25 based on the information shown at the display unit 26. The input unit 25 and display unit 26 may be constituted by a touch panel.

Figure 4:
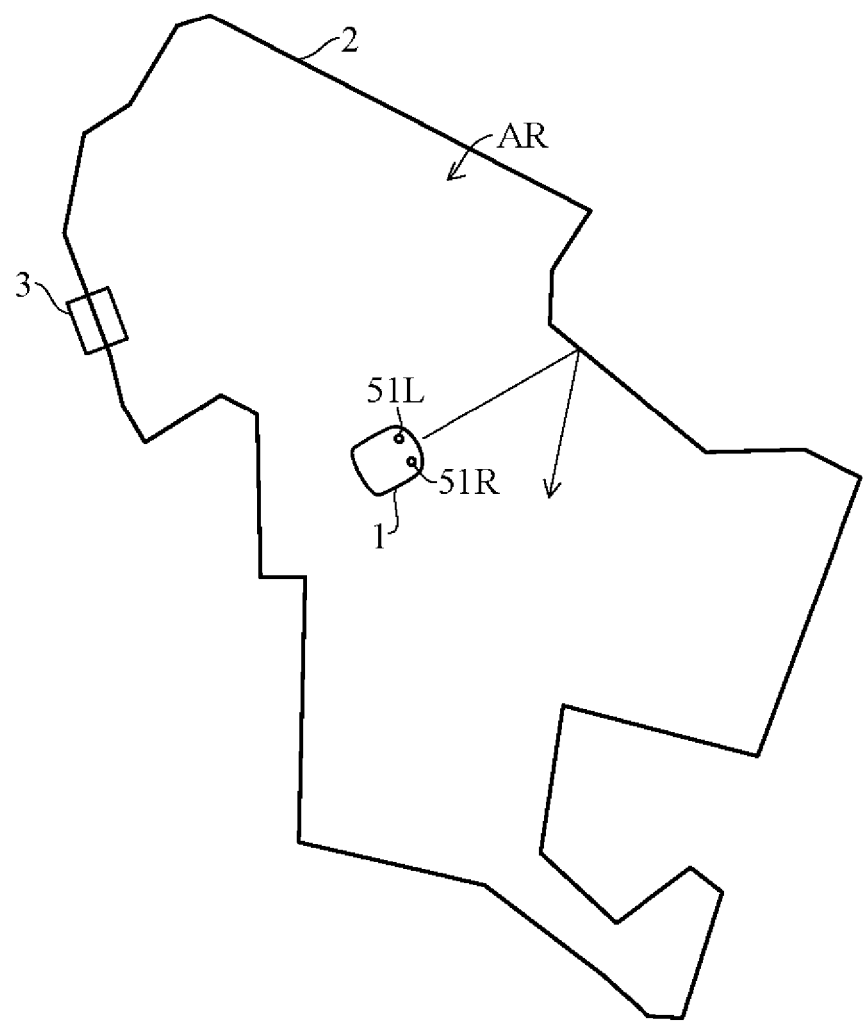
FIG. 4 is a diagram showing an example of a working area.

The vehicle 1 configured as described above performs a task while autonomously navigating within a predefined working area. FIG. 4 is a diagram showing an example of a working area AR. The working area AR is, for example, delineated by a boundary wire 2 that constitutes a boundary line (L0) and is laid beforehand (e.g., buried a predetermined depth under the ground surface GR). A magnetic field is generated in the working area AR by passing electric current through the boundary wire 2. The charging station 3 for charging the battery 20 is situated above the boundary wire 2. The working area AR defines the travel range of the vehicle 1 and may include not only area(s) to be serviced but also area(s) not to be serviced.

Figure 5:
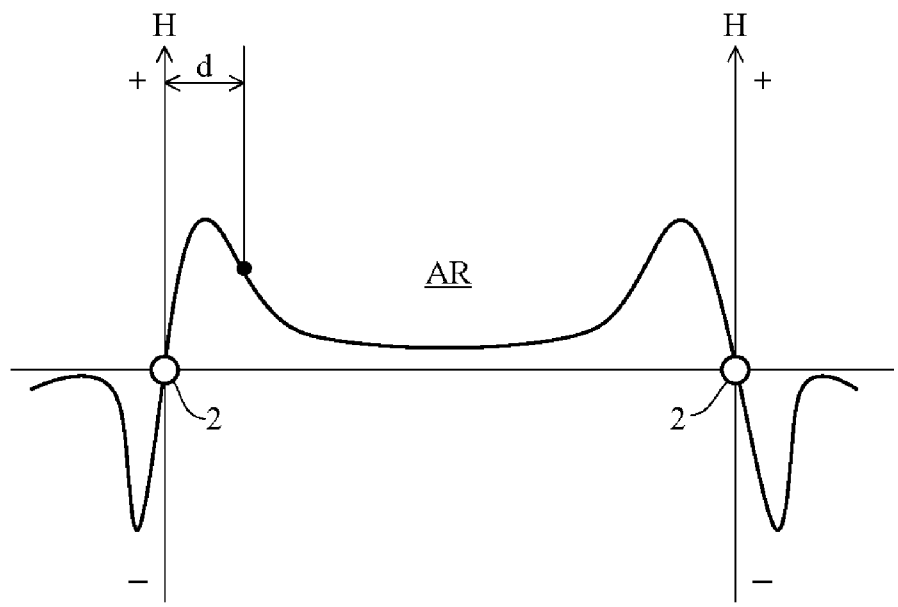
FIG. 5 is a diagram showing relation between distance from the boundary wire and magnetic field strength.
Figure 6:
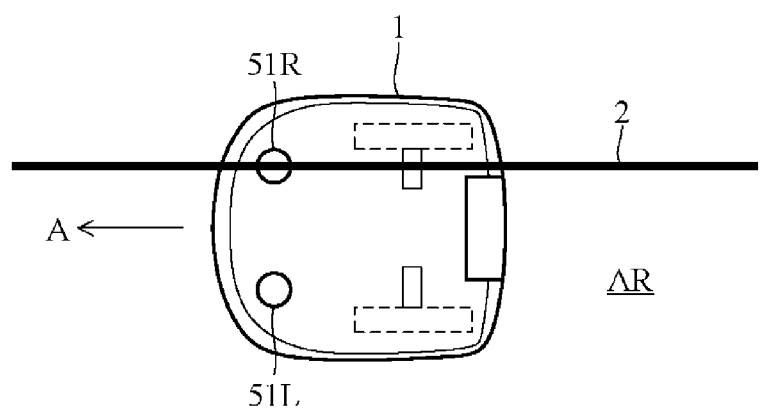
FIG. 6 is a diagram showing operation of the utility vehicle in trace mode.

FIG. 5 is a diagram showing relation between distance d from the boundary wire 2 and magnetic field strength H. As indicated in FIG. 6, magnetic field strength H varies with distance d from the boundary wire 2. Specifically, magnetic field strength H is 0 above the boundary wire 2, positive inside the working area AR, and negative outside the same. When work is in progress, the ECU 40 reads outputs of the magnetic sensors 51L and 51R, and when the output is minus, turns the vehicle 1 toward inside the working area AR at a random angle based on, for example, the output of the angular velocity sensor 52. As a result, work can be carried out inside the working area AR while the vehicle 1 is being driven (forward at random, for example).

In the present embodiment, the vehicle 1 operates in work mode, trace mode and return mode in response to control commands sent from the ECU 40 in accordance with programs prepared beforehand and memorized in the memory (ROM). In work mode, the vehicle 1 works (mows lawn or grass) while autonomously navigating in the working area AR. In return mode, the vehicle 1 is returned to the charging station 3 when residual voltage of the battery 20 detected by the voltage sensor 58 falls to or below a predetermined value and the battery 20 requires charging. In trace mode, the vehicle 1 is driven along the boundary wire 2. Trace mode is executed before work mode to ascertain the working area AR. Once the working area has been ascertained, trace mode need not be executed at every work mode.

FIG. 6 illustrates operation of the vehicle 1 in trace mode. As shown in FIG. 6, in trace mode, operation of the travel motors 18 is controlled (by control commands sent from the ECU 40) to make the vehicle 1 circuit along the boundary wire 2 with one or the other of the pair of magnetic sensors 51R and 51L (e.g., magnetic sensor 51L) positioned inside the boundary wire 2 and so that the other magnetic sensor (e.g., 51R) moves above the boundary wire 2 in the direction of arrow A. Specifically, the ECU 40 monitors the output of the magnetic sensor 51R and controls operation of the travel motors 18L and 18R so that magnetic field strength H detected by the magnetic sensor 51R stays at 0.

For example, when magnetic field strength H detected from the output of the magnetic sensor 51R becomes positive, the vehicle 1 is turned rightward by decelerating right travel motor 18R and accelerating left travel motor 18L. On the other hand, when magnetic field strength H detected from the output of the magnetic sensor 51R becomes negative, the vehicle 1 is turned leftward by accelerating the right travel motor 18R and decelerating the left travel motor 18L. As a result, the magnetic sensor 51R is brought near the boundary wire 2 and magnetic field strength H detected from the output of the right magnetic sensor 51R is maintained at 0.

Trace mode is started from a state in which the charging terminals 22 of the vehicle 1 are connected to connection terminals of the charging station 3 and ends when the charging terminals 22 again connect to the connection terminals after the vehicle 1 makes a circuit along the boundary wire 2. Position of the vehicle 1 from start to finish of trace mode travel is detected from the output of the position sensor 55. Based on the output from the position sensor 55, the ECU 40 identifies working area AR boundary line (L0 in FIG. 7) position coordinates with respect to the charging station 3 as a reference (origin).

Work mode generally encompasses random driving mode and parallel driving mode. As shown in FIG. 4, random driving mode is a mode in which the vehicle 1 is turned at a random angle every time the vehicle 1 reaches the boundary wire 2, thereby driving the vehicle 1 forward in randomly different directions in the working area AR (random driving). Parallel driving mode is a mode in which the vehicle 1 is shifted or moved by a predetermined pitch increment in a predetermined direction every time the vehicle 1 reaches at the boundary wire 2, thereby driving the vehicle 1 back and forth in the working area AR (parallel driving).

Although parallel driving enables the vehicle 1 to travel thoroughly throughout the working area AR, its back-and-forth travel in a predetermined direction tends to form ugly ruts. Mowing of lawn or grass in the working area AR is therefore best done by operating the vehicle 1 in random driving mode. However, operation in random driving mode tends to cause disparity between working area regions serviced at high and low frequency, so that cutting height differences occur from one spot to another. Moreover, when lawn or grass of greater than a certain height is mowed, increased load on the work unit 16 (work motor 17) may make mowing itself impossible. The controller for an autonomously navigating utility vehicle of this embodiment is therefore configured as set out in the following in order to mow the working area AR uniformly in random driving mode.

As shown in FIG. 3, the ECU 40 has as functional constituents a map generating unit 41, a memory unit 42, a target cell setting unit 43, and a travel controlling unit 44.

In trace mode, the map generating unit 41 generates a map of the working area AR (working area map MP) based on the output of the position sensor 55 when the vehicle 1 is driven in trace mode. Travel by trace mode is required only once after laying the boundary wire 2 and the working area map MP obtained at this time is memorized or stored in a memory (memory unit 42, for example, or another memory in the RAM or ROM) of the ECU 40.

Figure 7:
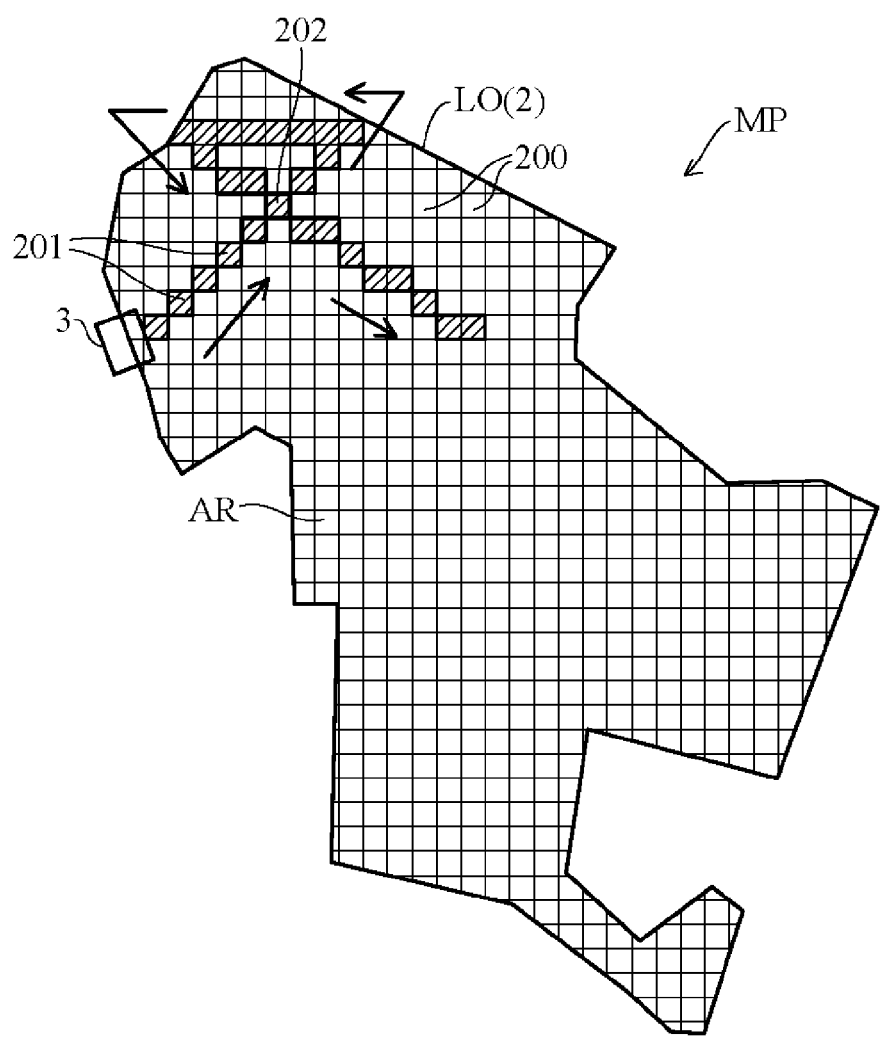
FIG. 7 is a diagram showing an example of a working area map generated by a map generating unit shown in FIG. 3.

FIG. 7 is a diagram showing an example of the working area map MP. In FIG. 7, position of the boundary wire 2 on the working area map MP is represented by boundary line L0 of the working area AR. The working area map MP is generated using position (latitude and longitude) of the boundary wire 2 detected from the output of the position sensor 55 and position (latitude and longitude) of the charging station 3.

Specifically, position of the charging station 3 at the start of trace mode travel is taken as an origin and the working area AR inside the boundary line L0 is divided grid-like at equal intervals on an orthogonal two-axis coordinate plane (XY plane) based on a predetermined direction defined from the output of the orientation sensor 54. By this, a plurality of cells 200 are arrayed in the working area AR to form the working area map MP. Each of the cells 200 of the so-formed working area map MP has its own unique position coordinates (X coordinate and Y coordinate).

Otherwise, rather than dividing the working area AR inside the boundary line L0 at equal intervals, it is possible instead to define a predetermined position (e.g., position of the charging station 3) as an origin and generates the cells 200 at predetermined pitch in X direction and Y direction. Size of the cells 200 can be varied as appropriate and can, for example, be defined to coincide with working width of the work unit 16 (maximum outer diameter of blade).

The memory unit 42 memorizes cell-specific data of the individual cells 200. The cell data include position data, and counted number of times of vehicle 1 servicing in work mode (counted number of times of each of the cells 200 over which the vehicle passes in work mode). Based on the output of the position sensor 55, the memory unit 42 identifies each of the cells 200 on the working area map MP over which the vehicle 1 passes in work mode and updates the counted number (of times) n of the concerned one of the cell 200s each time the vehicle 1 passes over by incrementing the counted number n by 1.

For example, when the vehicle 1 travels through the working area AR as indicated by arrows in FIG. 7, the counted number n of a cell 201 (hatched) on the working area map MP over which the vehicle 1 passes once is incremented by 1. Regarding another cell 202, as the vehicle 1 passes over it twice, its counted number n comes to be incremented by 2. The fact that the memory unit 42 thus memorizes servicing number data for each of the cells 200 individually makes it possible to identify the servicing frequency of each of the cell 200s individually.

The target cell setting unit 43 uses the counted number n memorized in the memory unit 42 as a basis for selecting from among the cells 200 in the working area AR those ones that are to be mowed and defines them as a target cell(s) 210. The target cell(s) 210 is, for example, selected based on an average value of all counted numbers n in the working area map MP (averaged counted number). The average value of counted number is calculated by dividing the total (sum total) of the counted numbers n of all cells 200 in the whole working area map MP by the total number of cells 200 in the whole working area map MP.

Therefore, the target cell setting unit 43 calculates the averaged counted number and sets as the target cell(s) 210 among the cells 200 in the working area AR whose counted number n memorized in the memory unit 42 is smaller by a predetermined value (e.g., 5) than the averaged counted number. The predetermined value is an integer equal to or greater than 0, and can be suitably set by the operator through the input unit 25. However, since the vehicle 1 cannot pass over the boundary wire 2 (boundary line L0), the fact that the boundary line L0 is not present between concerned one of the cells 200 and the vehicle 1 is the target cell(s) 210 setting condition. Alternatively, rather than setting the target cell(s) 210 based on an averaged counted number, it is possible to set as the target cell(s) 210 any of cells 200 whose counted number n memorized in the memory unit 42 is equal to or smaller than the predetermined value (e.g., 5). In this case, the operator can suitably input through the input unit 25 an integer equal to or greater than 0 as the predetermined value.

In work mode, the travel controlling unit 44 controls operation of the travel motors 18 so that the vehicle 1 travels straight forward at random inside the working area AR. Moreover, arrival of the vehicle 1 at the boundary line L0 (boundary wire 2) is determined from the outputs of the magnetic sensors 51 and when it is determined to have reached the boundary line L0, the vehicle 1 is turned toward the target cell(s) 210 based on the output of the orientation sensor 54.

Figure 8:
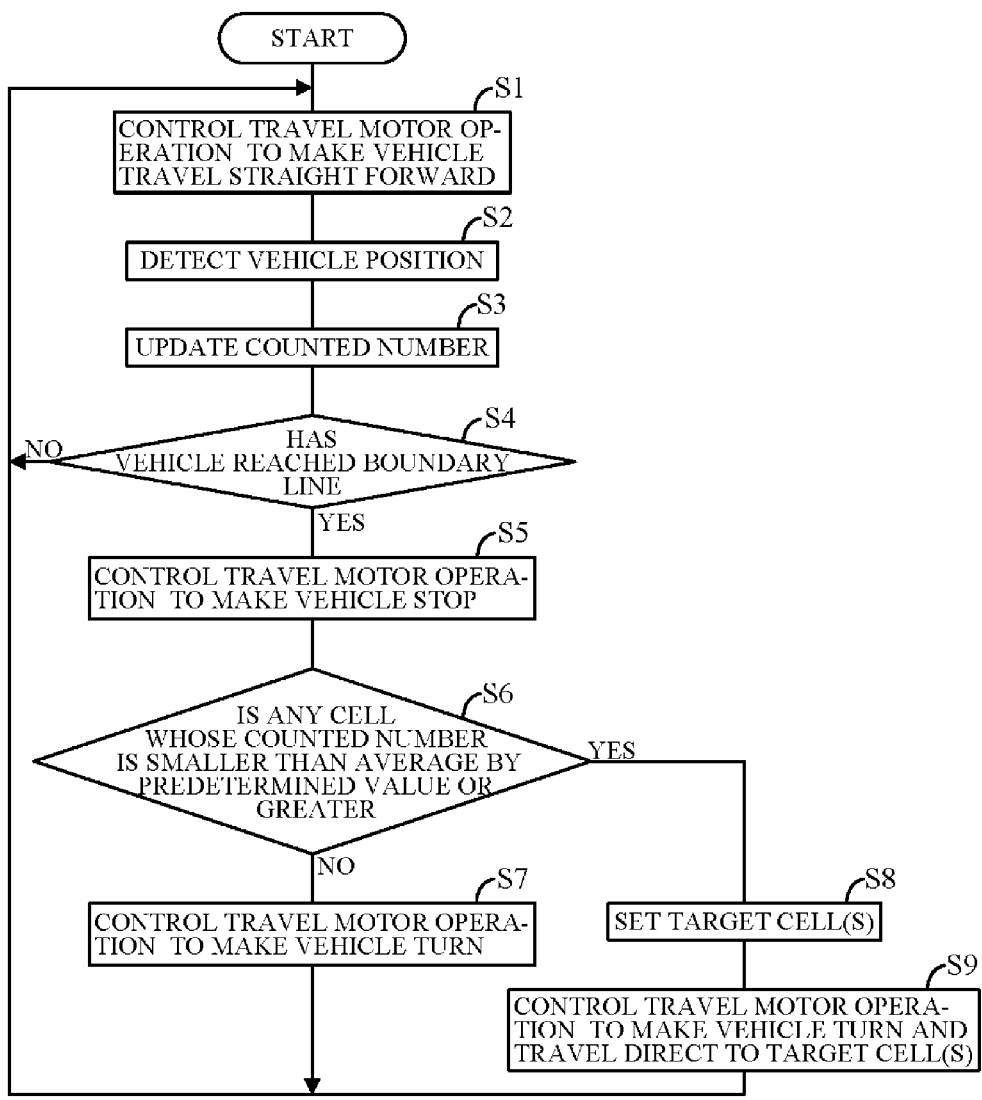
FIG. 8 is a flowchart showing an example of processing executed by the ECU shown FIG. 3.

FIG. 8 is a flowchart showing an example of processing executed in the ECU 40 in work mode. The processing shown in this flowchart is started, for example, when the vehicle 1 leaves the charging station 3.

First, in S1, operation of the travel motors 18 is controlled to make the vehicle 1 travel straight forward in the working area AR (S: processing Step). Next, in S2, position data (latitude and longitude) of the vehicle 1 are acquired from the output of the position sensor 55, and position of the vehicle 1 on the working area map MP is detected based on such position data. Next, in S3, the memory unit 42 performs processing to identify concerned one of the cells 200 on the working area map MP where the vehicle 1 is positioned and to update its counted number n by incrementing by 1.

Next, in S4, it is determined whether the vehicle 1 has reached the boundary line L0 based on the output of the magnetic sensors 51. When the result in S4 is YES, the program goes to S5, and when NO, returns to S1. In S5, operation of the travel motors 18 is controlled to make the vehicle 1 stop.

Next, in S6, the averaged counted number is calculated from count numbers n memorized in the memory unit 42 and to determine whether any of the cells 200 exists in the whole working area map MP whose counted number n is smaller than the averaged counted number by the predetermined value (e.g., 5) or greater. When the result in S6 is NO, the program goes to S7, and when YES, to S8.

In S7, operation of the travel motors 18 is controlled to make the vehicle 1 turn toward the inside of the working area AR by a random angle. In other words, since in this case there is little disparity among the counted numbers n of the cells 200, the vehicle 1 is turned by a random angle without setting the target cell(s) 210. For example, a random number generator is used to calculate a random turning angle toward inside the working area AR, and the vehicle 1 is turned by that turning angle on the basis of the output of the Yaw sensor 52. The program then returns to S1.

On the other hand, in S8, one whose counted number n is smallest is selected from among all cells 200 in the whole working area map MP and is set these as the target cell(s) 210. In this case, when two or more cells' counted numbers are smallest, any of them having the boundary line L0 present between itself and the vehicle 1 is excluded, and the target cell(s) 210 is selected from among the remaining ones. More specifically, this is done by determining whether a line segment connecting the current position of the vehicle 1 and the cell concerned intersects the boundary line L0, and when it is determined that it intersects the boundary line L0, the cell concerned is excluded as a candidate of the target cell(s) 210. When all of the cells 200 of smallest counted number n are excluded as the candidates of the target cell(s) 210, the target cell(s) 210 is selected from among any of the cells 200 whose counted number n is next smallest.

Next, in S9, direction (target direction) of the vehicle 1 toward the target cell(s) 210 is calculated. In addition, based on the output of the orientation sensor 54, operation of the travel motors 18 is controlled to make the vehicle 1 turn to the target direction and travel direct toward the target cell(s) 210. The program then returns to S1. As a result, the vehicle 1 can travel straight forward to, and carry out work in the target cell(s) 210.

Now follows a more concrete explanation of operation of the control apparatus for an autonomously navigating utility vehicle according the present embodiment.

Figure 9:
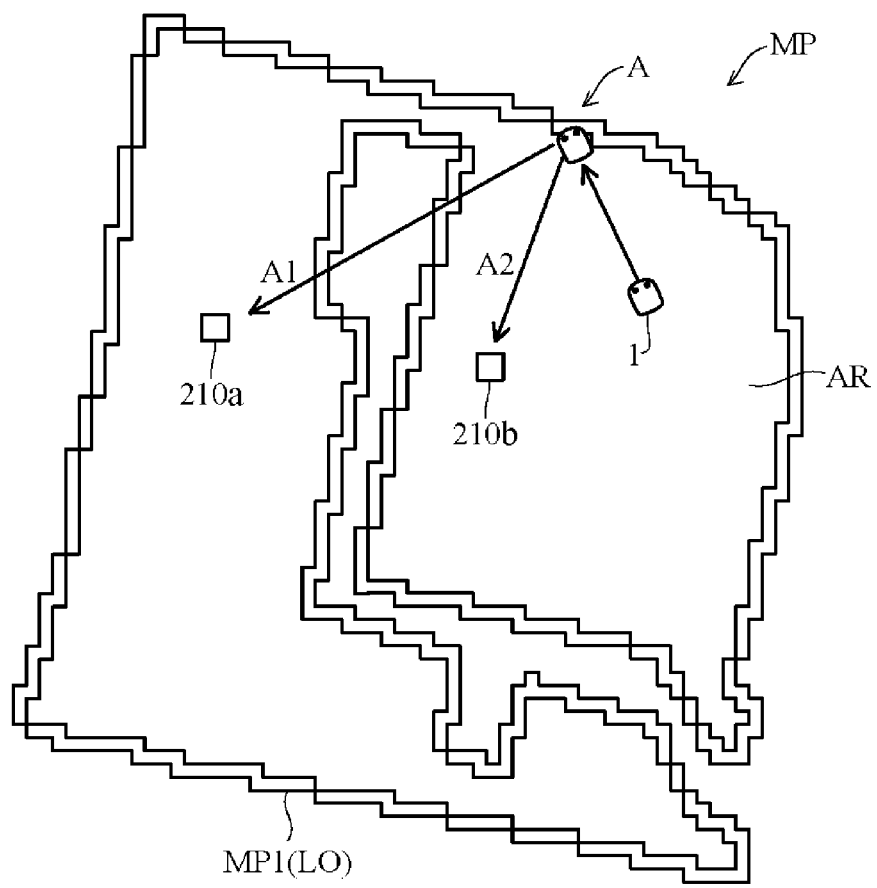
FIG. 9 is a diagram showing a modification of the map shown in FIG. 7.

FIG. 9 is a diagram showing another example of the working area map MP (modification of FIG. 7). In this drawing, region MP 1 surrounding the working area map MP corresponds to the region of the boundary line L0 laid with the boundary wire 2. Illustration of individual cells 200 of the working area map MP is omitted in FIG. 9.

Let us assume that the vehicle 1 traveling forward in the working area AR in work mode has reached the boundary wire 2 (boundary line L0) at position A. At this time, the target cell setting unit 43 calculates the averaged counted number by averaging the counted numbers n of the individual cells 200 and determines whether any of the cells 200 exists whose counted number n is smaller than the averaged count number by the predetermined value or more (S6). When no such cell exists, difference in servicing number of the cells 200 is small and difference in lawn or grass height is also small. In this case, the vehicle 1 is turned at a random angle (S7).

On the other hand, when any of the cells 200 exists whose counted number n is smaller than the averaged counted number by the predetermined value or more, the target cell setting unit 43 sets as the target cell(s) 210 one among cells 200 meeting this condition and not having the boundary line L0 present between itself and the vehicle 1 (S8). For example, assume that cells 210a and 210b in FIG. 9 both satisfy the condition of having the counted number n smaller than the averaged counted number by the predetermined value or more and that the counted number n of cell 210a is smaller than the counted number n of the cell 210b.

In this case, the vehicle 1 can not travel in the direction of the cell 210a (direction of arrow A1) because the boundary line L0 is present between the vehicle 1 and the cell 210a. Therefore, the target cell setting unit 43 excludes the cell 210a as the target cell(s) 210 candidate and sets the cell 210b as the target cell(s) 210. Once the target cell(s) 210 has been set, the vehicle 1 turns toward the target cell(s) 210 (S9) and thereafter travels forward in the direction of arrow A2 (S1). As a result, the vehicle 1 passes over the cell 210b of small counted number n. Therefore, mowing can be carried out in places with low servicing frequencies to realize uniform mowing in the working area AR.

As mentioned above, the present embodiment is configured to have an apparatus and method for controlling operation of an autonomously navigating utility vehicle (1) equipped with a prime mover (18) to travel about a working area (AR) delineated by a boundary line (L0) in order to perform work autonomously, characterized by: an electronic control unit (40) having a CPU and a memory, wherein the CPU is configured to function as a map generating unit (41) that generates a working area map (MP) of the working area (AR) comprised of an array of a plurality of cells (200); a position detector (55, 51, S2) that detects a first position of the vehicle (1) in the working area map (MP) and a second position of the vehicle (1) with respect to the boundary line (L0) of the working area (AR); a memory unit (42, S3) that counts and memorizes a number of times (n) the vehicle (1) passes over each of the cells (200) in the memory based on the first position of the vehicle (1) detected by the position detector (55, 51); a target cell setting unit (43, S6, S8) that selects one of the cells (200) based on the counted number (n) memorized in the memory unit (42) and sets the selected one as a target cell (210); and a travel controlling unit (44, S1, S4, S7, S9) that determines whether the vehicle (1) has reached the boundary line (L0) based on the second position of the vehicle (1) detected by the position detector (55, 51), and controls operation of the prime mover (18) to make the vehicle (1) travel about the working area (AR) until the vehicle (1) is determined to have reached the boundary line (L0) and make the vehicle (1) turn toward the target cell (210) set by the target cell setting unit (43) and then travel straight forward when the vehicle (1) is determined to have reached the boundary line (L0).

With this, owing to the fact that the target cell 210 is set in the working area map MP based the counted numbers n representing number of times the vehicle 1 passed over the cells 200, and the vehicle 1 is then turned toward the target cell 210, the vehicle 1 can be guided to and work in places of low servicing frequency. As a result, variance of servicing frequency decreases and the whole working area AR can be uniformly serviced (mowed). In other words, the vehicle 1 can be driven thoroughly throughout the working area AR by random driving, so that lawn or grass height difference is minimized and the appearance of the whole working area AR enhanced.

In the apparatus and method, the target cell setting unit calculates an average value of the counted numbers (n) by dividing a sum of the counted numbers (n) of the cells (200) by a total number of cells (200), sets selects one of the cells (200) whose counted number (n) memorized in the memory unit (42) are smaller than the average value by a predetermined value or more (S8)(43, S6, S8).

With this, in addition to the advantages and effects mentioned above, setting the cell 200 differing greatly from the averaged counted number as the target cell 210 in this manner makes it possible to locate and mow a least frequently serviced place and thereby ensure efficient work performance.

In the apparatus and method, the target cell setting unit sets as the target cell (210) one of the cells (200) whose counted number (n) memorized in the memory unit (42) is equal to or smaller than a predetermined value (43, S8).

With this, in addition to the advantages and effects mentioned above, setting of target cells 210 is easy in this case.

In the apparatus and method, the target cell setting unit sets the target cell (210) by selecting one other than a cell (200) among the cells (200) having the boundary line (L0) present between itself and the vehicle (1) when the vehicle (1) is determined by the travel controlling unit (44) to have reached the boundary line (L0) (43, S8).

With this, in addition to the advantages and effects mentioned above, since the boundary line L0 is not present between the vehicle 1 and the target cell 210, the vehicle 1 can easily reach and reliably service the target cell 210.

In the apparatus and method, the working area (AR) is delineated by the boundary line (L0) comprising a boundary wire (2) laid thereat; and the position detector detects the second position by detecting a magnetic field strength generated by electric current passing through the boundary wire (2)(55, 51, S2).

With this, in addition to the advantages and effects mentioned above, this makes it possible to accurately detect whether the vehicle 1 reached the boundary line L0 and to turn the vehicle 1 with good timing.

Although the present embodiment is configured such that the working area AR is delineated by the boundary line L0 comprising the boundary wire 2 laid thereat, the working area AR may be delineated without using the boundary wire 2 by any other detector such as the position sensor 55 or a camera.

When using the boundary wire 2, the working area AR may not always be delineated over the entire region encompassed by the boundary wire, but may be delineated only a part of the entire region by, for example, using an imaginary boundary line or the like.

Although the present embodiment is configured such that the position of the vehicle 1 on the working area map MP and that that relative to the boundary line L0 are detected by different detectors (i.e., position sensor 55 and magnetic sensor 51), the positions may be detected by the same detector.

Although the present embodiment is configured such that the map generating unit 41 generates the working area map MP of the working area AR comprised of an array of a plurality of cells 200, the configuration the cells 200 or calculation of the averaged counted numbers are not limited to those mentioned in the embodiment.

Although the present embodiment is configured such that the vehicle 1 is driven by the prime mover comprising a pair of travel motors 18L, 18R, it may be configured such that the vehicle 1 can be driven by other prime mover such as an internal combustion engine.

Although the present embodiment is configured such that the pair of magnetic sensors 51L, 51R are installed, the sensor 51 may be a single one.

It should be noted in the above that, although the present embodiment is applied for a lawn mower for lawn or grass mowing work, it may applied to any other type of utility vehicle.

It should also be noted that the above embodiment and one or more of the modifications can be freely combined.

While the present invention has been described with reference to the preferred embodiments thereof, it will be understood, by those skilled in the art, that various changes and modifications may be made thereto without departing from the scope of the appended claims.

What is claimed is:

1. An apparatus for controlling operation of an autonomously navigating utility vehicle equipped with a body and a prime mover mounted on the body to travel about a working area delineated by a boundary wire in order to perform work autonomously, the apparatus comprising:
   magnetic sensors installed spaced apart from each other in a lateral direction of the body of the vehicle, wherein each of the magnetic sensors detects a magnetic field strength generated by electric current passing through the boundary wire;
   a position sensor that determines a position of the vehicle; and
   an electronic control unit having a CPU and a memory;
   the CPU controls the vehicle to circuit along the boundary wire in trace mode based on output from at least one of the magnetic sensors, determines a boundary line for the working area based on output from the position sensor when the vehicle is driven in the trace mode, generates a map of the working area comprised of an array of cells, and stores a count number in the memory for each of the cells indicating a number of times the vehicle passes over each of the cells in work mode;
   the CPU, in the work mode, controls the vehicle to travel in the working area, acquires position data of the vehicle based on the output of the position sensor, identifies each of the cells on the map over which the vehicle passes in the work mode based on the position data, and updates the count number in the memory for individual ones of the cells each time the vehicle passes over the individual ones of the cells;
   the CPU, in the work mode, determines when the vehicle reaches the boundary wire based on the output of the magnetic sensors, controls the vehicle to stop when reaching the boundary wire, calculates an average of count numbers for the cells in the map, determines whether at least one of the cells has a count number smaller than the average by at least a predetermined value, controls the vehicle to turn toward the inside of the working area at a random angle when none of the cells have a count number that is smaller than the average by at least the predetermined value, selects a target cell from the at least one of the cells when the at least one of the cells has a count number smaller than the average by at least the predetermined value, and controls the vehicle to turn toward a target direction directed at the target cell.

2. The apparatus according to claim 1, wherein:
   the CPU calculates the average by dividing a sum of the count numbers for the cells by a total number of the cells.

3. The apparatus according to claim 1, wherein:
   the CPU increments the count number in the memory by a value of one for the individual ones of the cells each time the vehicle passes over the individual ones of the cells.

4. The apparatus according to claim 1, wherein:
   the CPU selects the target cell having a count number that is smallest among the at least one of the cells.

5. The apparatus according to claim 4, wherein:
   when a set of the cells have a count number that is smallest among the cells, the CPU excludes the cells of the set having the boundary line between itself and the vehicle, and selects the target cell from remaining ones of the set.

6. A method for controlling operation of an autonomously navigating utility vehicle equipped with a body and a prime mover mounted on the body to travel about a working area delineated by a boundary wire in order to perform work autonomously, the method comprising:
   controlling the vehicle to circuit along the boundary wire in trace mode based on output from at least one of a pair of magnetic sensors installed spaced apart from each other in a lateral direction of the body of the vehicle, wherein each of the magnetic sensors detects a magnetic field strength generated by electric current passing through the boundary wire;
   determining a boundary line for the working area based on output from a position sensor when the vehicle is driven in the trace mode;
   generating a map of the working area comprised of an array of cells;
   storing a count number in memory for each of the cells indicating a number of times the vehicle passes over each of the cells in work mode;
   controlling, in the work mode, the vehicle to travel in the working area;
   acquiring, in the work mode, position data of the vehicle based on the output of the position sensor;
   identifying each of the cells on the map over which the vehicle passes in the work mode based on the position data;
   updating the count number in the memory for individual ones of the cells each time the vehicle passes over the individual ones of the cells;
   determining, in the work mode, when the vehicle reaches the boundary wire based on the output of the magnetic sensors
   controlling the vehicle to stop when reaching the boundary wire;
   calculating an average of count numbers for the cells in the map;
   determining whether at least one of the cells has a count number smaller than the average by at least a predetermined value;
   when none of the cells have a count number that is smaller than the average by at least the predetermined value, controlling the vehicle to turn toward the inside of the working area at a random angle;
   when the at least one of the cells has a count number smaller than the average by at least the predetermined value, selecting a target cell from the at least one of the cells, and controlling the vehicle to turn toward a target direction directed at the target cell.

7. The method according to claim 6, wherein calculating an average of count numbers comprises:
   calculating the average by dividing a sum of the count numbers for the cells by a total number of the cells.

8. The method according to claim 6, wherein updating the count number in the memory comprises:
   incrementing the count number in the memory by a value of one for the individual ones of the cells each time the vehicle passes over the individual ones of the cells.

9. The method according to claim 6, wherein selecting a target cell from the at least one of the cells comprises:
   selecting the target cell having a count number that is smallest among the at least one of the cells.

10. The method according to claim 9, wherein selecting a target cell from the at least one of the cells comprises:
    when a set of the cells have a count number that is smallest among the cells, excluding the cells of the set having the boundary line between itself and the vehicle, and selecting the target cell from remaining ones of the set.

\* \* \* \* \*